United States Patent [19]

Takamatsu et al.

[11] Patent Number: 4,926,272
[45] Date of Patent: May 15, 1990

[54] METHOD FOR CONTROLLING A ROTATING STORAGE UNIT

[75] Inventors: Hisashi Takamatsu; Hisaharu Takeuchi; Mamoru Tohchi, all of Odawara, Japan

[73] Assignee: Hitachi, Ltd., Tokyo, Japan

[21] Appl. No.: 39,571

[22] Filed: Apr. 16, 1987

[30] Foreign Application Priority Data

Apr. 16, 1986 [JP] Japan .................. 61-85910

[51] Int. Cl.$^5$ .............................. G11B 5/09
[52] U.S. Cl. ....................... 360/49; 360/48
[58] Field of Search ............. 360/48, 49, 53, 63, 360/39

[56] References Cited

U.S. PATENT DOCUMENTS

| | | | |
|---|---|---|---|
| 4,638,381 | 1/1987 | Vaughn ........................ | 360/35.1 |
| 4,638,472 | 1/1987 | Ogata et al. ................. | 360/53 |
| 4,656,532 | 4/1987 | Greenberg et al. ........... | 360/49 |

FOREIGN PATENT DOCUMENTS

| | | | |
|---|---|---|---|
| 127311A | 12/1984 | European Pat. Off. ....... | 360/49 |
| 55-108915 | 8/1980 | Japan . | |
| 56-51010 | 5/1981 | Japan ........................... | 360/49 |
| 2022298 | 12/1979 | United Kingdom ........... | 360/48 |

Primary Examiner—Vincent P. Canney
Attorney, Agent, or Firm—Fay, Sharpe, Beall, Fagan, Minnich & McKee

[57] ABSTRACT

A method for controlling a rotating storage unit which parallelly transfers data between a plurality of heads of the rotating storage unit and a plurality of tracks of a record medium is disclosed. When there is a defective sector in any track, a non-defective sector which appears next to the defective sector as viewed in a sequence of logical arrangement of records in the sectors of the tracks is assigned as an alternative sector.

20 Claims, 4 Drawing Sheets

METHOD FOR CONTROLLING A ROTATING STORAGE UNIT

BACKGROUND OF THE INVENTION

1. Field of the Invention

The present invention relates to a method for controlling a rotating storage unit such as a magnetic disk storage unit, and more particularly to a control method suitable for parallel-transferring data on a plurality of tracks.

2. Description of the Prior Art

In a conventional magnetic disk storage unit, one magnetic disk is selected so that data on one track at a time is transferred. A data transfer rate between the magnetic disk storage unit and a host system is limited by a linear recording density and a rotation speed. On the other hand, performance of CPU's have been rapidly improved. Transfer capabilities of a channel have also been improved. As a result, a transfer capability of the magnetic disk storage unit is considerably lower than that of the channel. In order to maximize the transfer capability of the channel, it is necessary to substantially improve the transfer rate of the magnetic disk storage unit. In Japanese Patent Unexamined Publication No. 55-108915, a plurality of magnetic heads coupled to one accessing mechanism is simultaneously selected so that data is parallelly transferred from or to a plurality of tracks. When this method is applied to a known fixed record length type magnetic disk unit, the magnetic disk is sectioned so that each of the tracks has a record of data, and when data is to be read, the data is parallelly read from the sectors of the tracks and stored into a buffer memory and the stored data is transferred to the channel, and when data is to be written, the data to be written into the sectors of the tracks is transferred from the channel to the buffer memory and stored therein. The stored data is parallelly written onto the tracks.

There may exist a defect area on the medium at which information cannot be recorded or reproduced. In the fixed record length type magnetic disk storage unit, an alternative sector area of several record lengths is usually provided at an end part of the track, and if there is a defective area in a record, an alternative sector is assigned as the alternative sector area in the same track.

When the alternative area is assigned in this manner, the following problem will arise. If a defect in a sector of a track is detected during the readout of data by defect identification information recorded in that sector, data is read from the alternative sector area of that track, and then data of the tracks to be parallelly read is read from the sector next to the defective sector. Accordingly, if the defect is detected in one sector, the data of the next sector is read after the magnetic disk has been rotated one revolution. When the defect of a sector is detected while data is written, the data is written into the alternative sector area and then the data is written into the next sector. Thus, once the defective sector is detected, the data is written into the next sector after the magnetic disk has been rotated one revolution. In this manner, when the defective sector is detected, a waiting time is required for accessing the alternative sector and the input/output time significantly increases.

SUMMARY OF THE INVENTION

It is an object of the present invention to provide a method for solving the problem in the prior art and controlling a rotating storage unit having a high data input/output speed.

In accordance with the present invention, where there is a defective sector in a record medium of a fixed record length type rotating storage unit, an alternative sector for the defective sector appears following the defective sector when the sector array is viewed in accordance with a sequence of logical arrangement of records in the sectors of the tracks. Where the records are arranged on the record medium in this manner, identification information for indicating whether the sector is defective or not, and whether the next sector in the same track to which the sector in question belongs is defective or not, is recorded in each sector. In the read data mode, if a sector is detected to be defective by its identification information, the data read from the defective sector is disregarded and the data from the non-defective sector which appears next in the sequence of the logical arrangement is received in place of the data from the defective sector. In the write data mode, if the next sector in the same track to which the sector from which the identification information is read belongs is detected to be defective by the identification information of the sector, the data is not written into the defective sector but it is written into the non-defective sector which appears next in the sequence of the logical arrangement from the defective sector. In this manner, even when the defective sector exists, the data is read and written without waiting for the revolution of the record media.

In accordance with the present invention, the logical records are arranged in the sectors of the record medium in the ascending order or the sequence of the logical arrangement, even if defective sectors are included. Accordingly, the data can be read and written without waiting for the revolution. When the defective sector is involved, the logical read is arranged behind in the sequence of the logical arrangement. Accordingly, when a position of a record is to be detected on an assumption that there is no defective sector, that is, when a position of a leading record of a series of records to be read or written is to be specified by a logical position of the record, it can be carried out without waiting for the revolution of the record medium even if the defective sector is involved.

BRIEF DESCRIPTION OF THE DRAWINGS

These and other objects and advantages of the present invention will become apparent by reference to the following description and accompanying drawings, wherein.

DESCRIPTION OF THE PREFERRED EMBODIMENTS

Prior to the explanation of the control method for the rotating storage unit of the present invention, a control method in the prior art technique is explained.

Figure 1:
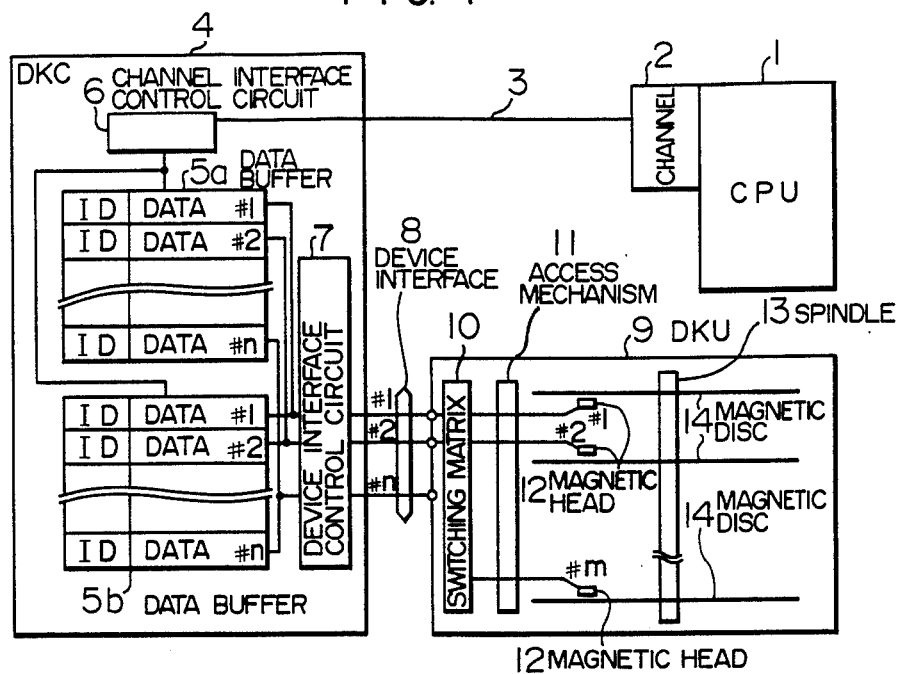
FIG. 1 shows a configuration of a control system of a fixed record length type storage unit.

FIG. 1 shows a configuration of a control system for a fixed record length type magnetic disk unit in which a plurality of magnetic heads driven by one accessing mechanism are parallelly selected so that data is parallelly transferred to or from a plurality of tracks. FIG. 1 also shows a configuration of a control system to which the present invention is applied.

A channel 2 attached to a CPU 1 is connected to a channel interface control circuit 6 of a disk control unit (DKC) 4 through a channel interface 3. Two planes of data buffers 5a and 5b are connected to the channel interface control circuit 6 and a device interface control circuit 7, which is connected to a switching matrix 10 of a disk drive unit (DKU) 9 through a device interface 8, and connected to a magnetic head 12 through an access mechanism 11. A spindle 13 rotates a plurality of magnetic discs 14. The switching matrix 10 selects any n of m magnetic heads simultaneously by a command from the DKC 4. The data buffers 5a and 5b are divided into n sections, respectively, and transfer data to and from the magnetic heads selected by the switching matrix 10.

Figure 2:
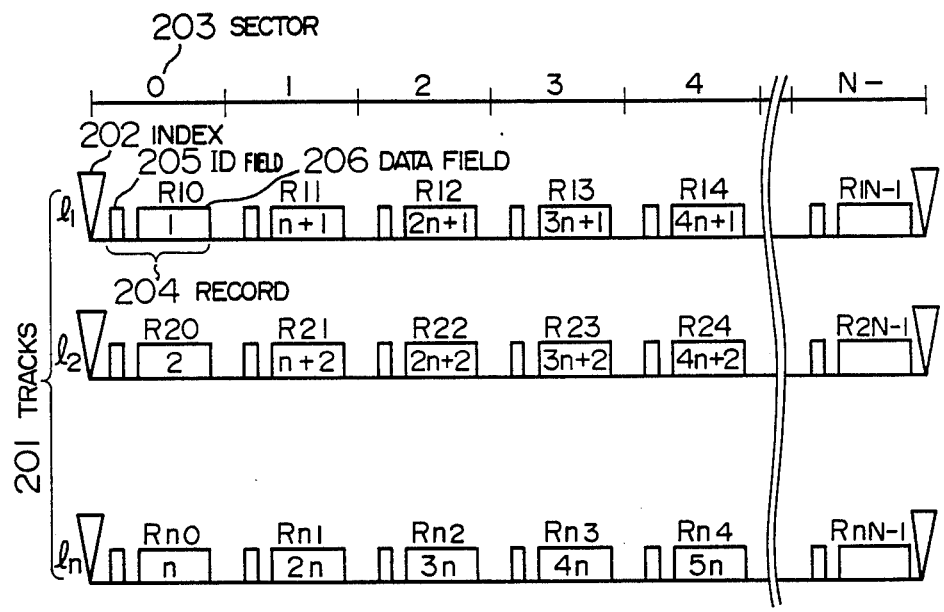
FIG. 2 shows a track format when no defect is included in a rotating storage medium.

FIG. 2 shows a track format. Since the fixed record length is used, the formats of the n selected tracks 201 ($l_1, l_2, \ldots l_n$) are equal. Since the data on the plurality of tracks is parallelly transferred, it is common that the logical sequence of records is $R_{10}, R_{20}, \ldots R_{n0}, R_{11}, R_{21}, \ldots R_{n1} \ldots$. Each track starts with an index 202 and is divided into N sectors 203 (0, 1, ... N−1), and each sector contains one record 204, which consists of an ID field 205 for recording a record address and a data field 206 for recording pure data. Each section of the data buffers 5a and 5b has a capacity of one record.

Figure 3:
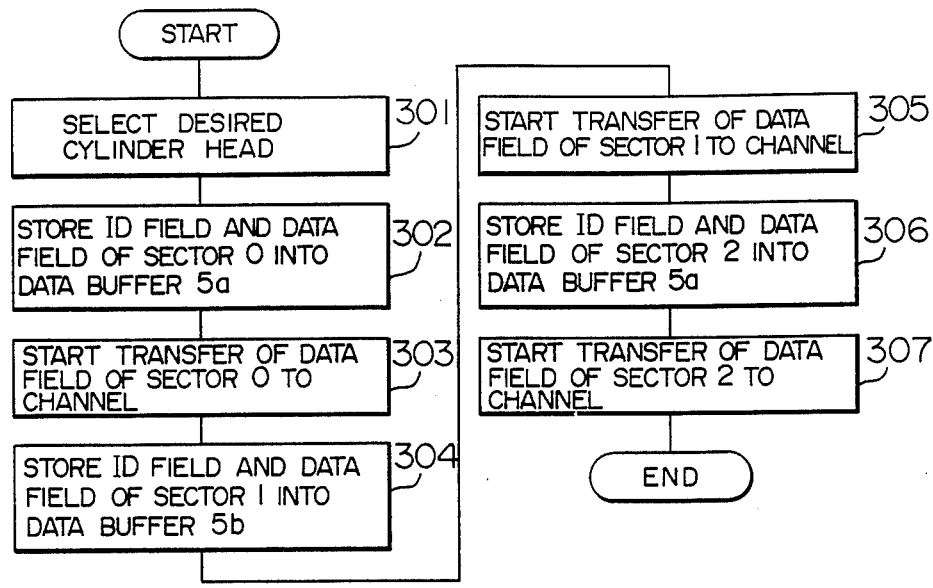
FIG. 3 shows a flowchart of a data read operation by a prior art technique when data is recorded in the track format shown in FIG. 2.

An operation to read the logical records 1, 2, ... 3n of the sectors 0–2 and transfer them to the CPU 1 in the present system is explained with reference to a flow chart of FIG. 3. In a step 301, the DKC 4 drives the access mechanism 11 to select a desired cylinder, and controls the switching matrix 10 to select the magnetic heads $l_1, l_2, \ldots l_n$. In a step 302, the ID field and the data field of the sector 0 of each track are read and stored into the corresponding section of the data buffer 5a. In a step 303, a control program in the DKC 4 instructs to the channel interface control circuit 6 to transfer the stored data fields to the channel 2 in the sequence of tracks $l_1, l_2, \ldots l_n$. If the transfer capability of the channel is n times as large as the transfer rate of the device, n tracks of data are transferred in a time period after the start of the transfer to the channel during which the magnetic head is advanced by the length of the data field. On the other hand, after the start of the transfer to the channel, the control program instructs the channel interface control circuit 6 to read the ID field and the data field of the sector 1 and store them into the corresponding section of the data buffer 5b. In a step 305, the control program of the DKC instructs to the channel interface control circuit 6 to transfer the stored data fields to the channel 2 in the sequence of tracks $l_1, l_2, \ldots l_n$. In steps 306 and 307, the data fields of the sector 2 are transferred to the channel 2 by using the data buffer 5a in the same manner as the steps 302 and 303. In this manner, the desired record can be read.

In the prior art, if a defective sector is detected by the identification information recorded in the ID field of the sector, data is read from the data field of an alternative sector of the track to which the defective sector belongs, and then data is read from the next sectors of all tracks. Accordingly, when the defective sector is included, a waiting time for the rotation of the record medium is required. Such waiting time is also required when the data is to be written.

The present invention resolves the problem encountered in the prior art. One embodiment of the method for controlling the rotating storage unit of the present invention is now explained. A configuration of the control system to which the present invention is suitably applied is shown in FIG. 1.

Figure 4:
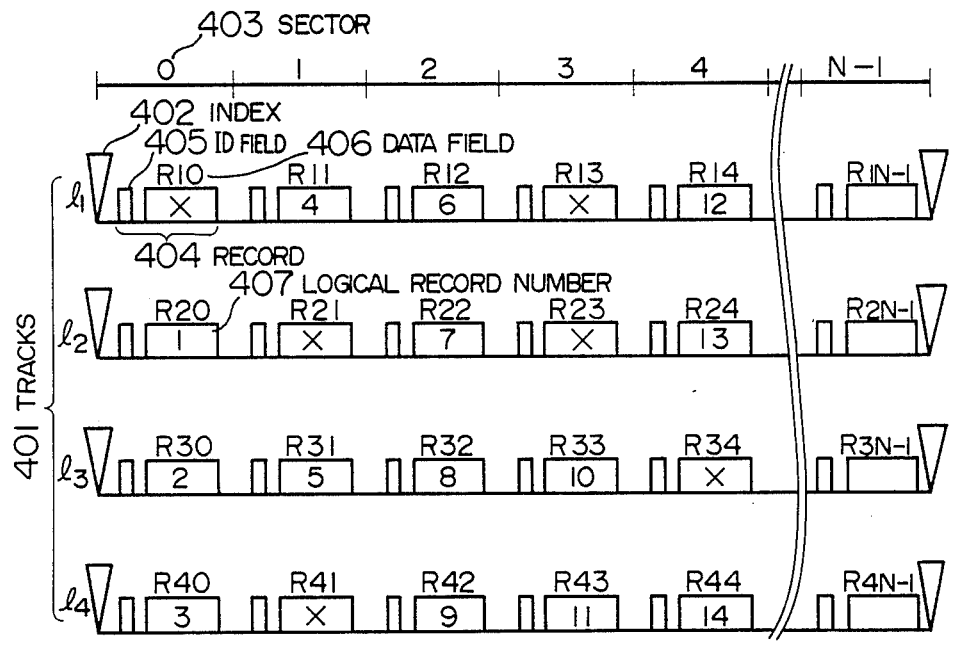
FIG. 4 shows a track format of a record medium when data is arranged in accordance with the present invention on tracks including a defective sector.

FIG. 4 shows a track format in the present invention. For the sake of explanation, it is assumed that the number n of tracks to or from which data is to be parallelly transferred is four, although it is not restrictive. It is assumed that six records 404 ($R_{10}, R_{21}, R_{41}, R_{13}, R_{23}, R_{34}$) of five sectors 403 (0–4) are defective sectors. As shown in FIG. 4, a logical record number 407 (1–14) is assigned to each physical record in the sector 403 (0–4) to initialize the track format. The ID field 405 of each record 404 has a logical record number (current logical record number) of the record, a sector defect flag (current sector defect flag) of its own sector, and a logical record number of the next record (next sector logical record number) and a sector defect flag thereof (next sector defect flag) on the track to which the record belongs. The current sector defect flag and the next sector defect flag indicate whether the current sector and the next sector are defective or not, respectively.

Figure 5:
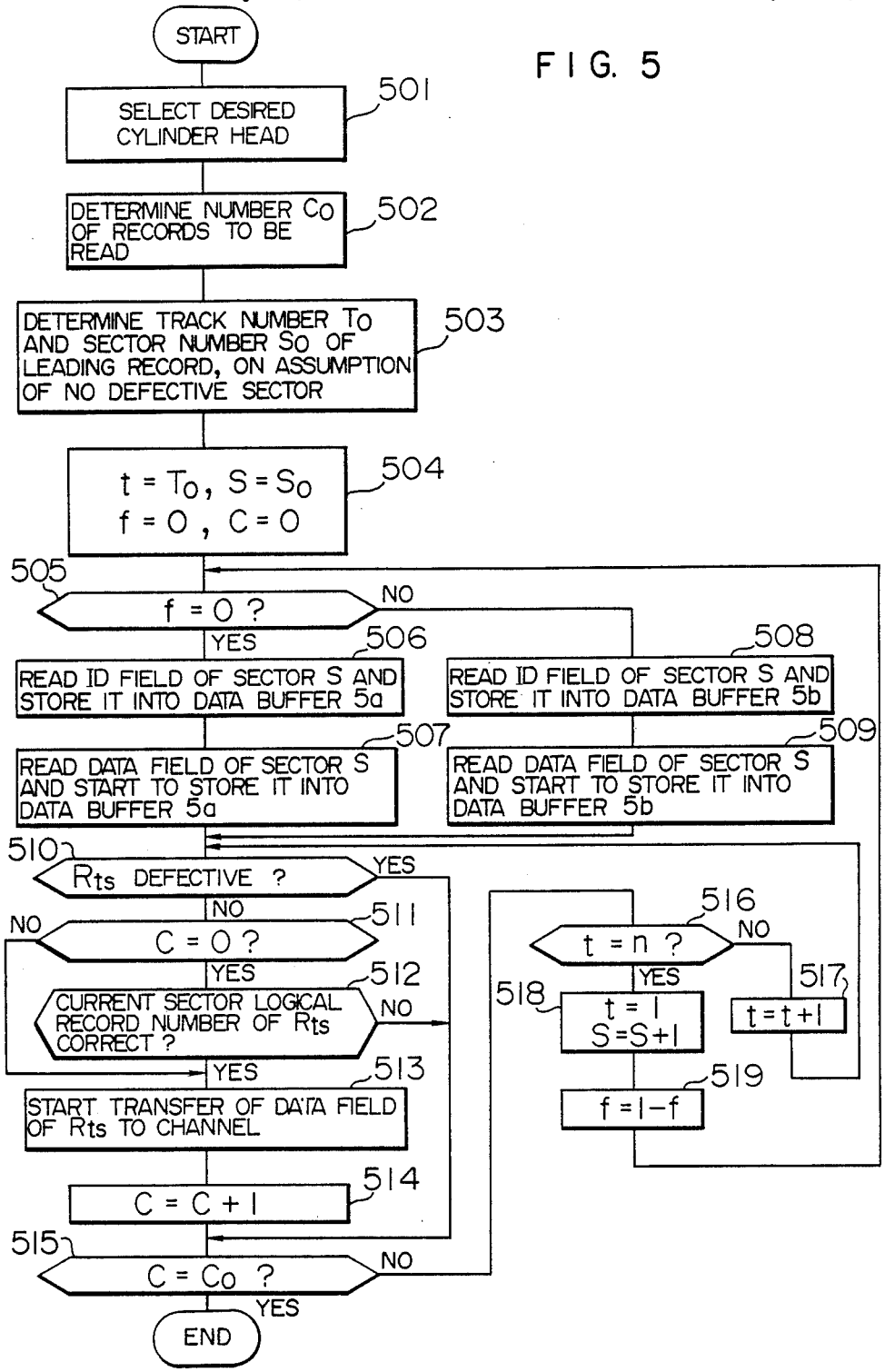
FIG. 5 shows a flowchart of a data read operation when data is recorded in the track format shown in FIG. 4.

The operation to read twelve records having the logical record number 407 (1–12) and to transfer them to the CPU 1 is explained with reference to a flow chart of FIG. 5. If there is no defective sector, those records are to be in three sectors 403 (0–2). In the present example, since there are defective sectors, those records are in discontinuous positions in five sectors 403 (0–4).

In a step 501, the DKC 4 drives the access mechanism 11 to select a desired cylinder, and controls the switching matrix 10 to select the magnetic heads $l_1, l_2, \ldots l_n$. For the sake of explanation, the selected magnetic head numbers are assumed to be 1, 2 ... n. In a step 502, the number $C_0$ of records to be read is determined from a parameter showing the number of records to be read or written included in parameters a channel command. In a step 503, a track number $T_0$ and a sector number $S_0$ of a leading record to be read are determined on the assumption that there is no defective sector. In the present example, $T_0=1$ and $S_0=0$. In a step 504, variables t, S, f and C are initialized. Namely, $t=T_0$, $S=S_0$, $f=0$ and $C=0$. The variables t and S represent track number and sector number of the record to be processed, f indicates which one of the data buffers is to be used, and C represents the number of records to which the transfer to the channel has been instructed. In a step 505, whether $f=0$ or not is checked. If $f=0$, the ID field of the sector S is read and stored into the data buffer 5a in a step 506. In a step 507, the device interface control circuit 7 is instructed to read the data field of the sector S and store it into the data buffer 5a. When a defective sector is read, a read error may be indicated but the data is stored into the data buffer anyway. The data of the defective sector is not transferred to the channel by the control to be described later. When $f \neq 0$, similar processing is performed in steps 508 and 509 to that of the steps 506 and 507 by using the data buffer 5*b*. Since f=0 initially, the data buffer 5*a* is used, and thereafter the data buffers 5*a* and 5*b* are alternately used by the control to be described later. In a step 510, the current sector defect flag of the track t in the ID field stored in the data buffer is examined. If it indicates the defective sector, the process proceeds to a step 515. In this case, the transfer of the data field of the record $R_{ts}$ to the channel in a step 513 is not instructed and the record of the defective sector is not transferred to the channel. If the sector is not defective, the process proceeds to a step 511 where whether C=0 or not, that is, whether the leading record is detected or not, is checked. If C≠0, it means that the leading record has been detected, and the process proceeds to the step 513. If C=0, it means that the leading record has not yet been detected and the process proceeds to a step 512 where whether the current sector logical record number of the record of the track t is equal to the logical record number of the leading record to be read is checked. If they are not equal, the process proceeds to a step 515. If they are equal, the process proceeds to the step 513 where the channel interface control circuit 6 is instructed to start the transfer of the data field of the record $R_{ts}$ of the track t to the channel. In a step 514, the variable C is incremented by one. In a step 515, whether C=$C_0$ or not, that is, whether the transfer of all records to the channel has been instructed or not, is checked. If C=$C_0$, the process terminates. If C≠$C_0$, the process proceeds to a step 516 where whether t=n or not, that is, whether all tracks in the sector have been processed or not is checked. If t≠n, the process proceeds to a step 517 where the variable t is incremented by one and the process proceeds to a step 510. If t=n, the process proceeds to a step 518 where the variable t is set to "1" and the variable S is incremented by one for processing the next sector. In a step 519, f is set to 1−f to change the data buffer to be used. Thus, each time the step 519 is carried out, the variable f is alternately set to "1" and "0". After the step 519, the process proceeds to the step 505.

Figure 6:
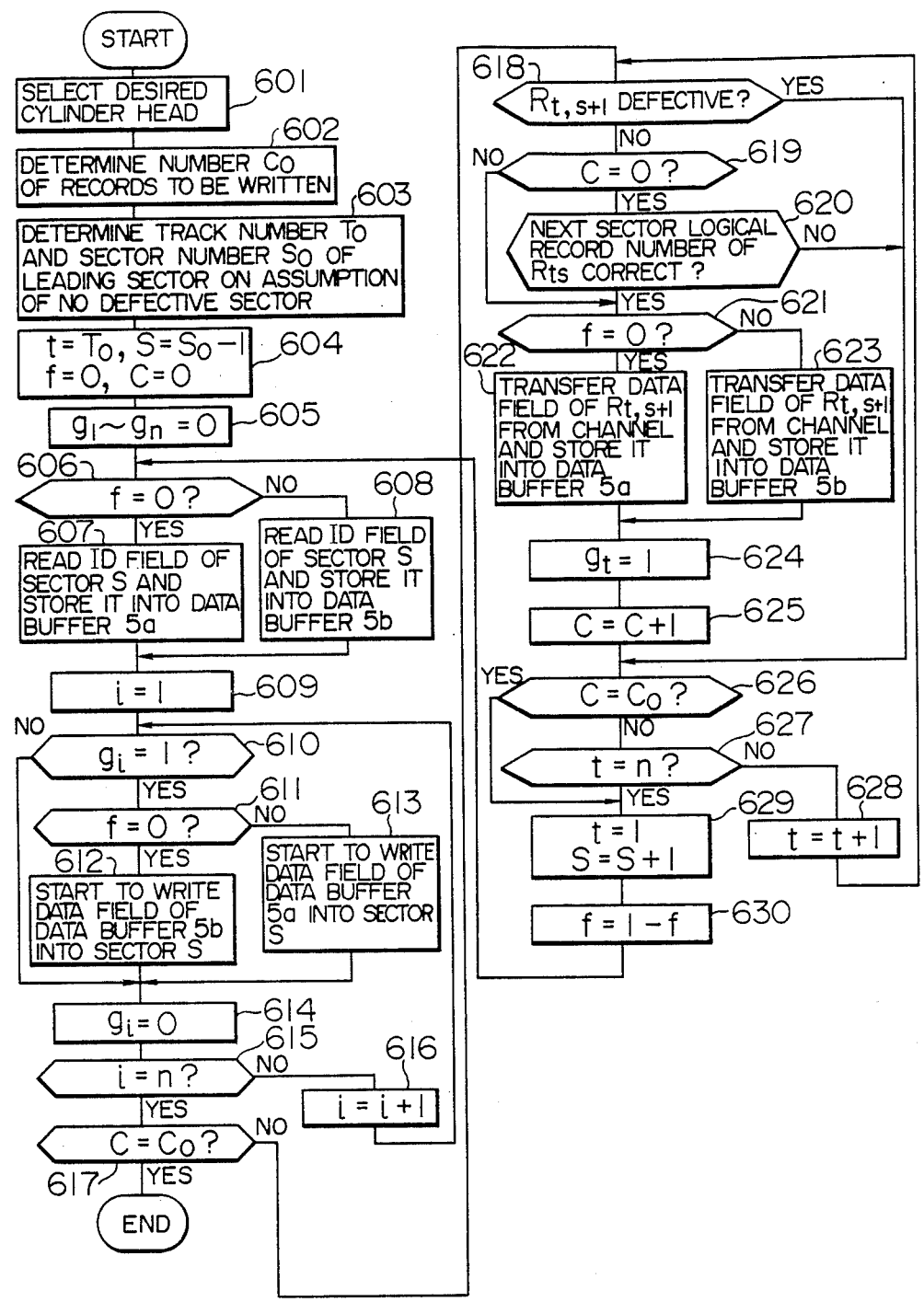
FIG. 6 shows a flowchart of a data write operation when data is recorded in the track format shown in FIG. 4.

The operation to transfer eight records of the logical record numbers 407 (5–12) from the CPU 1 and write them into the disk is explained with reference to a flow chart of FIG. 6. If there is no defective sector, those records are to be in two sectors 403 (1–2). Since there are defective sectors in the present example, those records are positioned discontinuously in four sectors 403 (1–4).

In a step 601, the DKC 4 drives the access mechanism 11 to select a desired cylinder and controls the switching matrix 10 to select the magnetic heads $l_1, l_2, \ldots l_n$. In a step 602, the number $C_0$ of records to be written is determined from the parameter of the channel command. In a step 603, a track number $T_0$ and a sector number $S_0$ of the leading record to be written are determined on the assumption that there is no defective sector. In the present embodiment, $T_0=1$ and $S_0=1$. In a step 604, the variables t, S, f and C are initialized. That is, t=$T_0$, S=$S_0$−1, f=0, and C=0. The variables t and S represent the track number and sector number of the record to be processed, f indicates which one of the data buffers is to be used, and C represents the number of records to be written into the disk. In a step 605, a variable gi (i=1, 2, ... n) is initialized to gi=0. When gi=1, it indicates that the record is to be written into the track i, and then gi=0, it indicates that the record is not to be written. In a step 606, whether f=0 or not is checked. If f=0, the ID field of the sector S is read in a step 607 and it is stored into the data buffer 5*a*. If f=1, the ID field of the sector S is read in a step 608 and it is stored into the data buffer 5*b*. In steps 609–616, gi is checked for i=1~n, and if gi=1, the device interface control circuit 7 is instructed to start to write the data field in the data buffer 5*a* or 5*b* into the data field of the track i, sector S, in accordance with the value of f. In a step 614, gi is initialized to zero in preparation for the write control of the data field of the next sector (S+1). In a step 617, whether C=$C_0$ or not, that is whether the write command to write all records to the discs has been issued or not is checked. If C=$C_0$, the process terminates. If C≠$C_0$, the process proceeds to a step 618 where the next sector defect flag of the track to in the ID field stored in the data buffer is checked. If it is a defective sector, the process proceeds to a step 626. When it is the defective sector, the storing of the data field of the record $R_{t,s+1}$ into the data buffer 5*a* or 5*b* in steps 622 and 623 is not carried out so that the data field of the record $R_{t,s+1}$ is not written into the defective sector. If it is not a defective sector, the process proceeds to a step 619 where whether C=0 or not, that is, whether the leading record is detected or not, is checked. If C≠0, it means that the leading record has been detected and the process proceeds to a step 621. If C=0, it means that the leading record has not yet been detected and the process proceeds to a step 620 where whether the logical record number of the next sector of the record of the track t is equal to the logical record number of the leading record to be written. If they are not equal, the process proceeds to a step 626. If they are equal, the process proceeds to steps 621–623 where the data field to be written into the record $R_{t,s+1}$ of the track t, sector S+1 is transferred from the channel and it is stored into the data buffer 5*a* or 5*b* depending on the value of f. In a step 624, the flag gt is set to "1" to allow writing of the data field of the record $R_{t,s+1}$ into the disk in the next sector S+1. In a step 625, the variable C is incremented by one. In a step 626, whether C=$C_0$ or not is checked. If C=$C_0$, the process proceeds to a step 629. If C≠$C_0$, the process proceeds to a step 627 where whether t=n or not, that is, whether all tracks in the sector have been processed or not, is checked. If t≠n, the variable t is incremented by one in a step 628 and the process proceeds to a step 618. If t=n, the variable t is set to "1" and the variable S is incremented by one in a step 629 to process the next sector. In a step 630, the variable f is set to 1−f to change the data buffer to be used. Thus, each time the step 630 is carried out, the variable f alternately assume "1" and "0". After the step 630, the process proceeds to the step 606.

In accordance with the present embodiment, no waiting time for rotation is necessary even if there is a defective sector in the records to be read or written.

While particular embodiments of the invention have been shown and described, it will be obvious to those skilled in the art that various changes and modifications may be made without departing from the present invention in its broader aspects.

We claim:

1. An apparatus for in parallel transferring a logical arrangement of data records, the data records including data field data and identification field data, between a plurality of heads of the storage unit and a cylinder formed of at least one track of each of a plurality of coaxially stacked disks of a recording medium, the apparatus comprising:

means for accessing in parallel the data records in the logical arrangement of sectors in a different track of the same cylinder;

means for reading identification field data from each data record of sectors accessed in parallel by the accessing means;

means coupled to the reading means for ascertaining a defective sector of the cylinder from a data record in the logical arrangement on a basis of read identification field data to determine a next non-defective sector from a data record in the logical arrangement; and means responsive to the determination of the ascertaining means for assigning the data record of the next non-defective sector to replace the data record of the defective sector.

2. The apparatus of claim 1 further comprising means for storing the identification field data, means for storing data field received from the data record, and means for communicating data field data to an associated data device.

3. A method of controlling a rotating data storage unit, having as a recording medium a plurality of coaxially stacked disks, including a cylinder formed of a plurality of tracks of each of a plurality of coaxially stacked disks of a recording medium, for in parallel transferring a logical arrangement of data records located on the same cylinder in an axial direction thereof between a plurality of heads of the storage unit and the plurality of tracks of the recording medium, said plurality of heads being adapted for concurrently accessing a required cylinder of said disks, and said logical arrangement of data records being made to non-defective sectors on tracks of different disks concurrently accessed by said plurality of heads, in a sequence axially of the cylinder, comprising the steps of:

(a) accessing in parallel the data records in the logical arrangement of sectors in a track of a different disk tracks of the same cylinder;

(b) ascertaining a defective sector from a data record in the logical arrangement;

(c) ascertaining a next non-defective sector from a data record in the logical arrangement in at least one of a logical reading and writing sequence; and (d) assigning the data record of the next non-defective sector to replace the data record of the defective sector.

4. The method of claim 3 further comprising the step of reading, from the recording medium, identification information indicative of whether a data record is defective.

5. The method of claim 4 further comprising the step of storing the identification information in a storage buffer.

6. The method of claim 5 further comprising the step of overwriting identification data in the storage buffer after successive reads of identification information.

7. A method of controlling a rotating data storage unit, having as a recording medium a plurality of coaxially stacked disks, for in parallel transferring a logical arrangement of data records between a plurality of heads of the storage unit and a plurality of tracks of the recording medium, said plurality of heads being adapted for concurrently accessing a required cylinder of said disks, and said logical arrangement of data records being made to non-defective sectors on tracks of different disks concurrently accessed by said plurality of heads, in a sequence axially of the cylinder, comprising the steps of:

(a) accessing in parallel the data records in the logical arrangement of sectors in each track;

(b) ascertaining a defective sector from a data record in the logical arrangement;

(c) ascertaining a next non-defective sector from a data record in the logical arrangement; and (d) assigning the data record of the next non-defective sector to replace the data record of the defective sector;

(e) reading, from the recording medium, identification information indicative of whether a data record is defective;

(f) storing the identification information in a storage buffer; and (g) alternately storing the identification information in a second storage buffer after successive reads of identification information.

8. A method of in parallel transferring a logical arrangement of data records between a plurality of heads of the storage unit and a cylinder formed of a plurality of tracks of each of a plurality of coaxially stacked disks of a recording medium, comprising the steps of:

(a) accessing in parallel the data records in the logical arrangement of sectors in a track of a different disk of the same cylinder;

(b) ascertaining a defective sector from a data record in the logical arrangement;

(c) ascertaining a next non-defective sector of the cylinder from a data record in the logical arrangement in at least one of a logical reading and writing sequence; and (d) assigning the data record of the next non-defective sector to replace the data record of the next defective sector.

9. The method of claim 8 further comprising the step of storing write data in at least one non-defective data record.

10. The method of claim 9 further comprising the step of reading the write data from an associated data source prior to the step of storing the write data in the at least one non-defective data record.

11. The method of claim 10 further comprising the step of storing the write data in a data buffer prior to the step of storing the write data in at least one non-defective data record.

12. A method of in parallel transferring a logical arrangement of data records between a plurality of heads of the storage unit and a cylinder formed of at least one track of each of a plurality of coaxially stacked disks of a recording medium, comprising the steps of:

(a) accessing in parallel the data records in the logical arrangement of sectors in each track of the cylinder;

(b) ascertaining a defective sector from a data record in the logical arrangement;

(c) ascertaining a next non-defective sector of the cylinder from a data record in the logical arrangement; and (d) assigning the data record of the next non-defective sector to replace the data record of the next defective sector;

(e) storing write data in at least one non-defective data record;

(f) reading the write data from an associated data source prior to the step of storing the write data in the at least one non-defective data record;

(g) storing the write data in a data buffer prior to the step of storing the write data in at least one non-defective data record; and (h) alternately storing write data read from the associated data source in a second data buffer.

13. The method of claim 8 further comprising the step of reading read data from at least one data record.

14. The method of claim 13 further comprising the step of storing the read data in a data buffer.

15. The method of claim 14 further comprising the step of overwriting read data stored in the data buffer when the read data has been read from a defective data record.

16. The method of claim 14 further comprising the step of transmitting the read data to an associated data device.

17. A method of in parallel transferring a logical arrangement of data records between a plurality of heads of the storage unit and a cylinder formed of at least one track of each of a plurality of coaxially stacked disks of a recording medium, comprising the steps of:

(a) accessing in parallel the data records in the logical arrangement of sectors in each track of the cylinder;

(b) ascertaining a defective sector from a data record in the logical arrangement;

(c) ascertaining a next non-defective sector of the cylinder from a data record in the logical arrangement; and (d) assigning the data record of the next non-defective sector to replace the data record of the next defective sector;

(e) reading read data from at least one data record;

(f) storing the read data in a data buffer;

(g) transmitting the read data to an associated data device;

(h) alternately storing read data from successive reads in a second data buffer.

18. The method of claim 11 further comprising the step of reading, from the recording medium, identification information indicative of whether a data record is defective.

19. The method of claim 18 further comprising the step of storing the identification information in a storage buffer.

20. The method of claim 14 further comprising the steps of reading, from the recording medium, identification information indicative of whether a data record is defective and storing the identification information in a storage buffer.

* * * * *